(12) United States Patent
Stoehr et al.

(10) Patent No.: US 11,476,472 B2
(45) Date of Patent: Oct. 18, 2022

(54) SEPARATOR PLATE FOR AN ELECTROCHEMICAL SYSTEM

(71) Applicant: Reinz-Dichtungs-GmbH, Neu-Ulm (DE)

(72) Inventors: Thomas Stoehr, Laupheim (DE); Andre Speidel, Bussmanhausen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 136 days.

(21) Appl. No.: 17/058,085

(22) PCT Filed: May 29, 2019

(86) PCT No.: PCT/EP2019/063991
§ 371 (c)(1),
(2) Date: Nov. 23, 2020

(87) PCT Pub. No.: WO2019/229138
PCT Pub. Date: Dec. 5, 2019

(65) Prior Publication Data
US 2021/0210769 A1 Jul. 8, 2021

(30) Foreign Application Priority Data
May 30, 2018 (DE) ..................... 20 2018 103 058.2

(51) Int. Cl.
*H01M 8/026* (2016.01)
*H01M 8/0206* (2016.01)
*H01M 8/0276* (2016.01)

(52) U.S. Cl.
CPC ......... *H01M 8/026* (2013.01); *H01M 8/0206* (2013.01); *H01M 8/0276* (2013.01)

(58) Field of Classification Search
None
See application file for complete search history.

(56) References Cited

U.S. PATENT DOCUMENTS

2015/0280253 A1   10/2015   Olsommer

FOREIGN PATENT DOCUMENTS

| DE | 10248531 A1 | 4/2004 |
|----|-------------|--------|
| WO | 2017046405 A1 | 3/2017 |
| WO | 2018055129 A1 | 3/2018 |

OTHER PUBLICATIONS

ISA European Patent Office, International Search Report Issued in Application No. PCT/EP2019/063991, dated Sep. 24, 2019, WIPO, 3 pages.

*Primary Examiner* — Helen Oi K Conley
(74) *Attorney, Agent, or Firm* — McCoy Russell LLP

(57) ABSTRACT

The invention relates to a separator plate for an electrochemical system, comprising: at least one first through-opening for conducting a reaction medium through the separator plate; an active region having structures for guiding a reactor medium along a flat side of the separator plate; and a first sealing structure, surrounding the first through-opening, for sealing the first through-opening. The first sealing structure has a first passage for conducting a reaction medium through the first sealing structure, which passage points in a direction facing away from the active region. The invention also relates to a bipolar plate for an electrochemical system, which bipolar plate comprises the described separator plate.

19 Claims, 11 Drawing Sheets

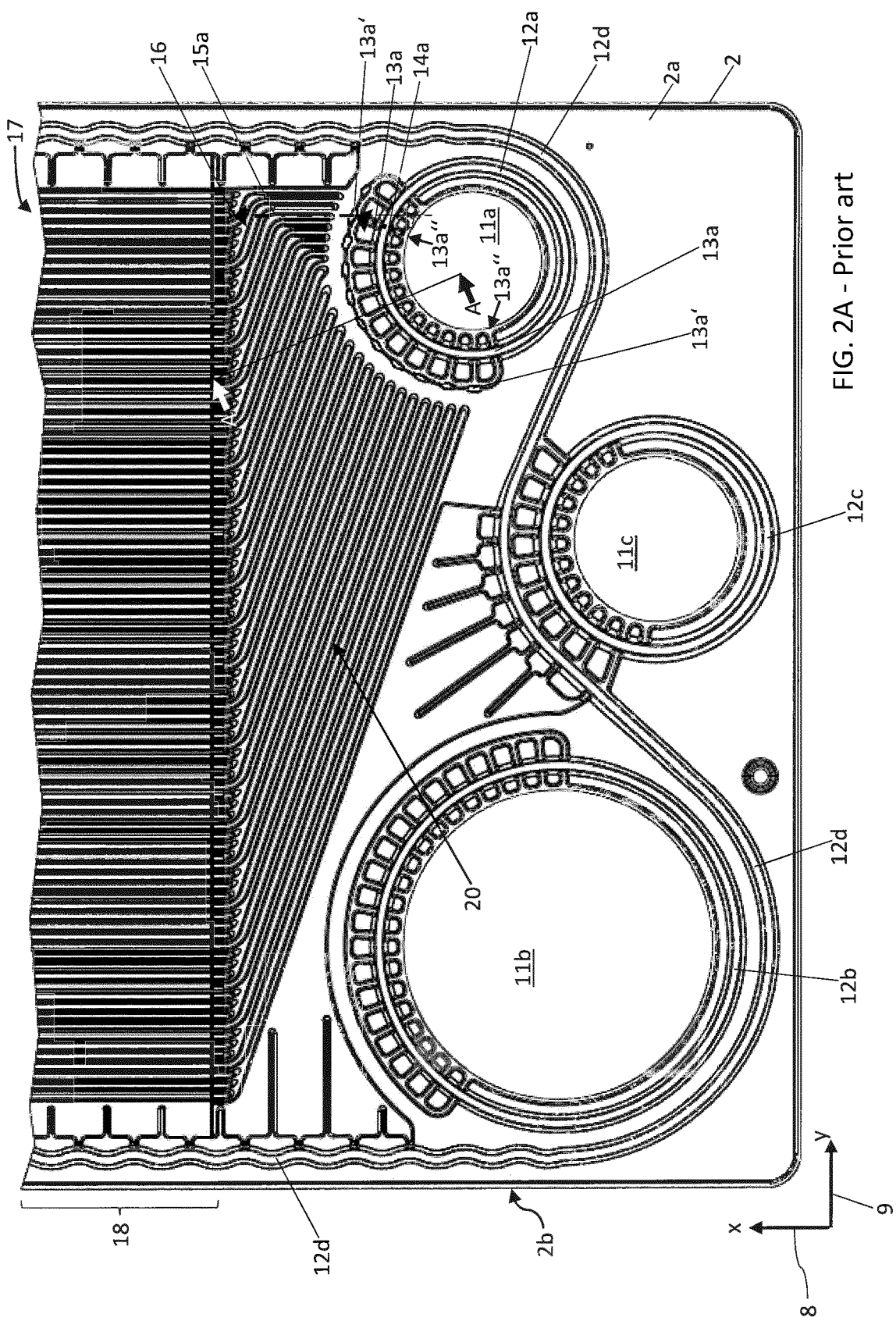
FIG. 2A - Prior art

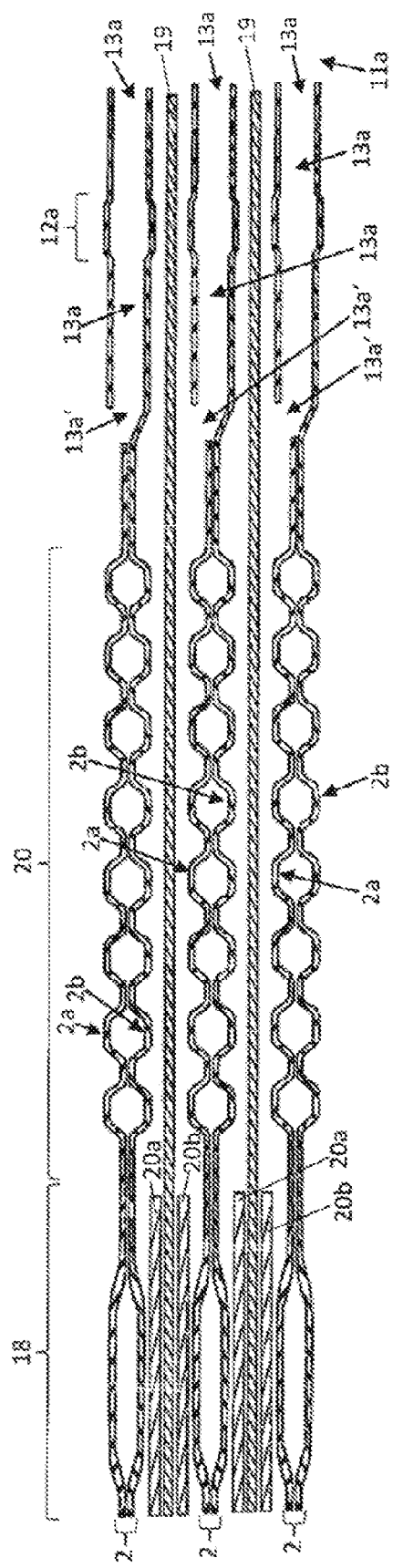
FIG. 2B - Prior art

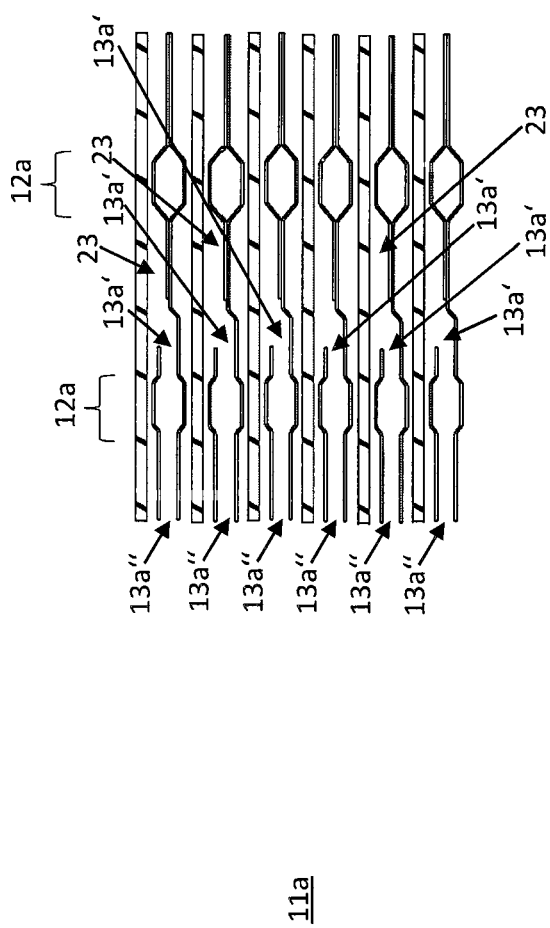
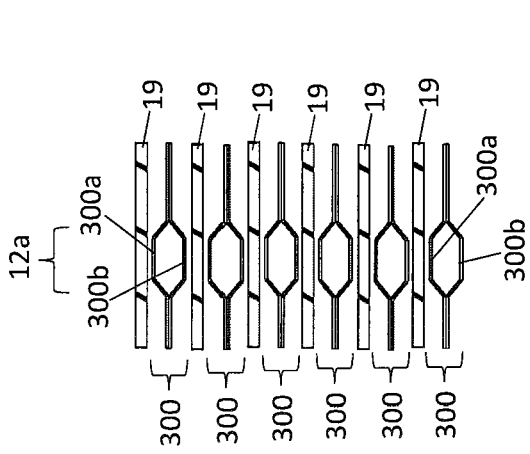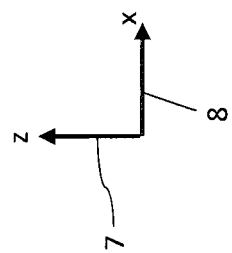
FIG. 3C

SEPARATOR PLATE FOR AN ELECTROCHEMICAL SYSTEM

CROSS-REFERENCE TO RELATED APPLICATIONS

The present application is a U.S. national phase of International Patent Application No. PCT/EP2019/063991, entitled "SEPARATOR PLATE FOR AN ELECTROCHEMICAL SYSTEM", and filed on May 29, 2019. International Patent Application No. PCT/EP2019/063991 claims priority to German Utility Model Application No. 20 2018 103 058.2, entitled "SEPARATOR PLATE FOR AN ELECTROCHEMICAL SYSTEM", and filed on May 30, 2018. The entire contents of the above-listed applications are hereby incorporated by reference for all purposes.

TECHNICAL FIELD

The present document primarily relates to a separator plate for an electrochemical system, to a bipolar plate comprising such a separator plate, and to an electrochemical system comprising a plurality of separator plates or bipolar plates.

BACKGROUND AND SUMMARY

Known electrochemical systems usually comprise multiple separator plates or multiple bipolar plates, each joined from two separator plates, which are arranged in a stack, so that every two adjacent separator plates or bipolar plates enclose an electrochemical cell or a humidifier cell. The separator plates as well as the bipolar plates joined from two separator plates, can be used, for example, for electrically contacting the electrodes of the individual electrochemical cells (for example, fuel cells) and/or for electrically connecting adjacent cells (series connection of the cells). The separator plates/bipolar plates can also be used to dissipate heat produced in the cells between the separator plates/bipolar plates. Waste heat of this kind can be produced, for example, at the time of conversion of electrical or chemical energy in a fuel cell.

The separator plates, and thus also the bipolar plates formed thereof, customarily each comprise at least one through-opening. The through-openings of the stacked separator plates/bipolar plates, which are aligned or at least partially overlap with one another in the separator plate stack, or in the bipolar plate stack, of the electrochemical system, then form media channels for feeding or discharging media. In order to seal the through-openings or the media channels formed by the through-openings of the separator plates/bipolar plates, known separator plates/bipolar plates also include sealing systems, which are each arranged the through-openings of the separator plate/bipolar plate. The sealing systems can, for example, be formed as sealing beads molded, and in particular embossed, into the particulate plate.

The separator plates can additionally include channel structures for supplying an active region of the separator plate/bipolar plate with one or more media, and/or for transporting media away. The active region of two separator plates/bipolar plates arranged opposite one another on opposite sides of the cell can, for example, enclose or delimit an electrochemical cell or a humidifier cell. For example, the media can be constituted by fuels (for example hydrogen or methanol), reaction gases (for example air or oxygen) or can be present as a coolant in the form of fed media, and can be constituted by reaction products and heated coolant as discharged media. In the case of fuel cells, the reaction media, that is, fuel and reaction gases, are usually guided over the surfaces of the bipolar plates facing away from one another, whereas the coolant is guided into a cavity formed between the two separator plates forming the bipolar plate.

The sealing systems arranged around the through-opening of the separator plate/bipolar plate can each have one or more passages. These passages are used to establish a fluid connection between the through-opening of the separator plate/bipolar plate and the active region, or between the through-opening of the bipolar plate and the above-described cavity of the bipolar plate. Corresponding passages are known, for example, from DE10248531A1, for example in the form of apertures in the flanks of the sealing beads.

Known separator plates or bipolar plates in addition typically comprise distribution regions arranged between the through-openings and the active region of the plate, which are used to distribute media that is fed to the particular plate via a through-opening of the plate as uniformly as possible across the active region of the plate. For this purpose, the distribution regions can include distribution structures, for example, in the form of webs and channels. However, other distribution structures are also conceivable. Comparable structures are used to collect a medium that is removed from the active region, and to guide it to a through-opening; the regions in question are likewise referred to as a distribution region here since only the flow-through direction is different. To ensure good efficiency of the electrochemical system, it is normally advantageous to design the surface area of the active region of the separator plate, or of the bipolar plate, as large as possible, and to keep the proportion of the surface area of the distribution regions as well as of the through-openings as small as possible. At the same time, however, as uniform a distribution as possible of the medium fed to the plate via the through-opening on or across the active region is to be ensured.

It is thus the object of the present invention to create a separator plate, or a bipolar plate, for an electrochemical system which ensures as efficient an operation of the electrochemical system as possible.

Thus, a separator plate for an electrochemical system is proposed, comprising: at least one first through-opening for conducting a reaction medium through the separator plate; an active region including structures for guiding a reaction medium along a flat side of the separator plate; and a first sealing structure surrounding the first through-opening for sealing the first through-opening, wherein the first sealing structure includes a first passage for conducting a reaction medium through the first sealing structure, wherein the first passage includes a first passage opening facing away from the first through-opening, wherein the first passage defines a first direction that is directed from the first through-opening to the first passage opening, and wherein the first through-opening is in fluid connection with the active region by way of the first passage.

Compared to known separator plates, the separator plate provided here is characterized in that the first passage is arranged and formed in such a way that the first direction includes an angle of at least 100 degrees (angular dimension) with a second direction.

The second direction is defined by a shortest straight connecting line which connects the first passage opening of the first passage to a media inlet or to a media outlet of the active region, wherein the second direction is directed from the first passage opening of the first passage to the media inlet or outlet of the active region. The shortest straight connecting line defining the second direction is to be determined purely geometrically, and independently of a flow direction of the medium along the plate surface. The first direction and the second direction each define a directed arrow. The angle of at least 100 degrees included by the first direction and the second direction is to be the angle included by the corresponding arrow tips, which is smaller than or equal to 180 degrees (no reflex angles).

The orientation of the first passage provided here has the effect that the medium, when flowing from the first through-opening toward the active region, is at least partially redirected on its path from the first passage opening to the inlet of the active region. Often times, the flow velocity of the medium is also decreased at least in sections. In this way, a particularly homogeneous distribution of the medium across the active region can be achieved. For example, a distribution region, which is typically arranged between the first through-opening and the active region and formed to guide and distribute the medium on its path from the first passage opening to the inlet of the active region, is formed smaller in the case of the separator plate provided here, and the active region is formed accordingly larger. The power density of an electrochemical system comprising the separator plate provided here can thus be improved. Likewise, it may be possible to feed at least the coolant at a lower pressure level than in the case of conventional separator plates, resulting in a lower energy consumption of the overall system. The angle included by the first direction and the second direction can also be at least 105 degrees, least 110 degrees, and at least 120 degrees. In some designs, it is even possible for the angle to be at least 140 degrees.

The first passage normally furthermore has a second passage opening facing the first passage opening. The first direction, which defines the orientation of the first passage, can be defined by a shortest straight line, for example, also referred to as a straight through-conduction line, which connects the first passage opening to the second passage opening.

The separator plate can furthermore comprise a perimeter sealing structure, which surrounds the first sealing structure and the active region. The perimeter sealing structure and the first sealing structure can then be formed in such a way that a section of the first sealing structure and a section of the perimeter sealing structure define a channel delimited by the first sealing structure and by the perimeter sealing structure. In this case, the first passage opening facing away from the first through-opening can, for example, be in fluid connection with the aforementioned inlet or outlet of the active region by way of this channel defined by the first sealing structure and by the perimeter sealing structure. The media flow between the first passage and the active region is thus guided, redirected and/or diverted by the perimeter sealing structure at least in regions. This usually already results in enhanced distributed along the width, that is, the medium, even before reaching the distribution region, is distributed, in a direction that is perpendicular to the overall media flow direction of the active region, over a width that is greater than the sum of the width of the through-opening out of which the medium flows and the length of width of the passage to the first passage opening in the same direction. The walls of the sealing structures, which are present anyhow, form a media conducting structure in the process, and make it possible to optimally utilize the available space. No additional components, such as sealing frames or the like, are necessary for guiding the medium.

The separator plate can furthermore at least comprise a second through-opening for conducting a coolant or a reaction medium through the separator plate. The separator plate then typically furthermore comprises a second sealing structure, which surrounds the second through-opening, for sealing the second through-opening.

The perimeter sealing structure and the second sealing structure can then be formed in such a way that a section of the second sealing structure and a section of the perimeter sealing structure define a channel that is delimited by the second sealing structure and by the perimeter sealing structure. The first passage opening facing away from the first through-opening can then be in fluid connection with the aforementioned inlet or outlet of the active region by way of this channel defined by the second sealing structure and by the perimeter sealing structure. The media flow between the first passage and the active region is thus guided, redirected and/or diverted by the perimeter sealing structure and by the second sealing structure at least in regions, without necessitating separate components or structures for this purpose.

The first sealing structure and the second sealing structure can also be formed in such a way that a section of the first sealing structure and a section of the second sealing structure define a channel that is delimited by the first sealing structure and by the second sealing structure. The first passage opening facing away from the first through-opening can then be in fluid connection with the aforementioned inlet or outlet of the active region by way of this channel defined by the first sealing structure and by the second sealing structure. The media flow between the first passage and the active region is thus guided, redirected and/or diverted by the first sealing structure and by the second sealing structure at least in regions.

The separator plate can be formed from metal, such as stainless steel. A metal sheet of which the separator plate is formed can, for example, have a thickness of no more than 150 µm, of no more than 120 µm, or of no more than 100 µm. The separator plate may include a coating, at least in sections, at least on the surface thereof, which is used to distribute reaction medium.

The first sealing structure and/or the second sealing structure and/or the perimeter sealing structure can be formed as sealing beads, or a sealing bead, embossed into the separator plate. In particular, it may be advantageous when the perimeter sealing structure encloses all first and second sealing structures, that is, when a perimeter bead extends so as to surround all other sealing structures of a separator plate. As an alternative or in addition, the structures of the active region for guiding a reaction medium can also be embossed into the separator plate.

The separator plate can comprise a distribution region arranged between the first through-opening and the active region. In particular, the first passage opening of the first passage can be in fluid connection with the active region by way of the distribution region. The distribution region can comprise distribution structures, which are configured to distribute, across the active region, a reaction medium that, proceeding from the first passage opening of the first passage, is introduced into the distribution region and/or to collect or to pool, toward the first passage opening, a reaction medium that, proceeding from the active region, flows toward the first passage opening of the first passage. The distribution structures of the distribution region can also be embossed into the separator plate.

The separator plate can be formed of exactly one layer of a metal sheet, for example of exactly one layer of a stainless steel sheet.

The first passage opening of the first passage of the separator plate can, for example, be formed as a through-window, as a through-hole, or as a cut-through in the separator plate. In this case, medium is able to flow from a first flat side of the separator plate, through the first passage opening, onto a second flat side of the separator plate, or vice versa. When the first passage opening of the first passage of the separator plate is formed as a through-window, a through-hole, or a cut-through in the separator plate, it is thus in particular disposed at a distance from the border or from a lateral edge of the separator plate.

Furthermore, a bipolar plate for an electrochemical system is proposed. The bipolar plate comprises a first separator plate of the type described above as well as a second separator plate, wherein the first separator plate and the second separator plate are formed from metal, such as stainless steel. The first separator plate and the second separator plate of the bipolar plate are connected to one another. The second separator plate likewise comprises a first through-opening, which is aligned with the first through-opening of the first separator plate, wherein the mutually aligned first through-openings of the first separator plate and of the second separator plate form a first through-opening of the bipolar plate. The active region of the first separator plate then forms an active region of the bipolar plate.

The first separator plate and the second separator plate of the bipolar plate may be welded together, in particular by a laser welded connection.

One first separator plate and exactly one second separator plate form the bipolar plate. For example, the first separator plate of the bipolar plate and the second separator plate of the bipolar plate can each be formed of exactly one layer of a metal sheet, for example they can each be formed of exactly one layer of a stainless steel sheet, wherein the metal sheets can optionally, in particular in sections, comprise a coating. In contrast to many approaches of the prior art, in this way one or two separate sealing frame or frames can be dispensed with. In this case, the bipolar plate is thus made of exactly two layers, and in particular of two metal layers.

If the first separator plate of the bipolar plate comprises the above-described channel defined by the first sealing structure of the first separator plate and the perimeter sealing structure of the first separator plate, the connection, and in particular the welded connection, between the first and second separator plates of the bipolar plate can be formed, at least in sections, in the region of the channel that is defined by the first sealing structure of the first separator plate and by the perimeter sealing structure.

If the first separator plate of the bipolar plate comprises the above-described channel defined by the second sealing structure of the first separator plate and the perimeter sealing structure of the first separator plate, the connection, and in particular the welded connection, between the first and second separator plates of the bipolar plate can, as an alternative or in addition, be formed, at least in sections, in the region of the channel that is defined by the second sealing structure of the first separator plate and by the perimeter sealing structure of the first separator plate.

And if the first separator plate of the bipolar plate comprises the above-described channel defined by the first sealing structure of the first separator plate and the second sealing structure of the first separator plate, the connection, and in particular the welded connection, between the first and second separator plates of the bipolar plate can, alternatively or additionally, be formed, at least in sections, in the region of the channel defined by the first sealing structure of the first separator plate and by the second sealing structure of the first separator plate.

The space requirement for feeding and distributing the media is also reduced by this dual use, and the surface area available as an active surface is increased.

If the first separator plate of the bipolar plate includes the above-described second through-opening, the second separator plate of the bipolar plate can also include a second through-opening. The second through-opening of the first separator plate and the second through-opening of the second separator plate can then be aligned with one another and form a second through-opening of the bipolar plate. The first separator plate and the second separator plate of the bipolar plate can furthermore enclose a cavity for conducting a coolant through the bipolar plate. This cavity is typically delimited by a rear side of the active region of the bipolar plate which faces the cavity. In this way, heat can be dissipated from the active region of the bipolar plate by way of coolant that is conducted through the cavity.

The cavity of the bipolar plate can, for example, be in fluid connection with the second through-opening of the bipolar plate. The fluid connection between the second through-opening of the bipolar plate and the cavity of the bipolar plate can, for example, open into the second through-opening of the bipolar plate on a side of the second through-opening of the bipolar plate which faces the active region. In this way, coolant can be conducted from the second through-opening of the bipolar plate into the cavity, or from the cavity to the second through-opening of the bipolar plate, in the most direct way possible. This can contribute to particularly efficient cooling of the bipolar plate.

The second through-opening of the bipolar plate can be formed in such a way, or be shaped in such a way, that a cross-section of the second through-opening of the bipolar plate which is determined parallel to a planar surface plane of the bipolar plate increases toward the active region, at least in an end section of the second through-opening of the bipolar plate which faces the active region. For example, the second through-opening, parallel to an overall media flow direction, in the active region, can have a maximum diameter or a maximum width, which has a first end facing the active region. The aforementioned cross-section of the second through-opening can then be determined perpendicularly to this maximum diameter of the second through-opening. In a contiguous section along the maximum diameter of the second through-opening, the aforementioned cross-section of the second through-opening can consistently increase strictly monotonically toward the active region. This contiguous section can have a first end facing the active region and a second end facing away from the active region. A distance of the first end of the contiguous section from the first end of the maximum diameter of the second through-opening can be 10 percent of the length of the maximum diameter of the second through-opening. As an alternative or in addition, a distance of the second end of the contiguous section from the first end of the maximum diameter of the second through-opening can be 40 percent of the length of the maximum diameter of the second through-opening. The transition to a border of the through-opening, which runs substantially perpendicularly to the overall media flow direction of the active region, can nonetheless, in particular with respect to improved stampability, be rounded, in particular when the second through-opening of the bipolar plate is in fluid connection with the aforementioned cavity of the bipolar plate, for example for introducing coolant into the cavity or for discharging coolant from the cavity, this contributing to particularly efficient cooling of the active region of the bipolar plate. For example, the fluid connection between the second through-opening and the cavity can in this way have a particularly large flow cross-section, in particular at the site where the connection opens into the second through-opening.

As an alternative or in addition, the first through-opening of the bipolar plate can be formed in such a way, or be shaped in such a way, that a cross-section of the first through-opening of the bipolar plate which is determined parallel to the planar surface plane of the bipolar plate increases in a direction facing away from the active region, at least in an end section of the first through-opening which faces away from the active region. For example, the first through-opening, parallel to an overall media flow direction, in the active region, can have a maximum diameter, which has a first end facing the active region. The aforementioned cross-section of the first through-opening can then be determined perpendicularly to this maximum diameter of the first through-opening. In a contiguous section along this maximum diameter of the first through-opening, the aforementioned cross-section of the first through-opening can consistently increase strictly monotonically in the direction facing away from the active region. This contiguous section can have a first end facing the active region and a second end facing away from the active region. A distance of the first end of the contiguous section from the first end of the maximum diameter of the first through-opening can be 60 percent of the length of the maximum diameter of the first through-opening. And as an alternative or in addition, a distance of the second end of the contiguous section from the first end of the maximum diameter of the first through-opening can be 90 percent of the length of the maximum diameter of the first through-opening.

Furthermore, the first through-opening of the bipolar plate and the second through-opening of the bipolar plate can be arranged next to one another along a direction that is directed transversely or perpendicularly to a shortest straight connecting line between the first through-opening and the active region.

As an alternative, it is conceivable that the second through-opening of the bipolar plate is arranged between the first through-opening of the bipolar plate and the active region of the bipolar plate.

Furthermore, an electrochemical system is provided, comprising a plurality of separator plates or bipolar plates as described above, and comprising membrane assemblies arranged between the bipolar plates, in particular comprising membrane assemblies arranged in each case between adjacent bipolar plates. The electrochemical system can be formed as a fuel cell stack or as an electrolyzer, for example. The membrane assemblies can then, for example, each comprise at least one electrolyte membrane. As an alternative, the electrochemical system can also be formed as a humidifier, wherein the membrane assemblies can then, for example, each comprise at least one water exchange membrane.

BRIEF DESCRIPTION OF THE FIGURES

Exemplary embodiments of the separator plate, of the bipolar plate, and of the electrochemical system are depicted in the figures and are explained in greater detail in the following description. In the drawings:

FIG. 2A schematically shows a known separator plate in a top view;

FIG. 2B schematically shows a section through a stack of known bipolar plates;

FIG. 3C schematically shows a section through an electrochemical system comprising a stack of bipolar plates, which each include the separator plate shown in FIGS. 3A and 3B.

DETAILED DESCRIPTION

Figure 1:
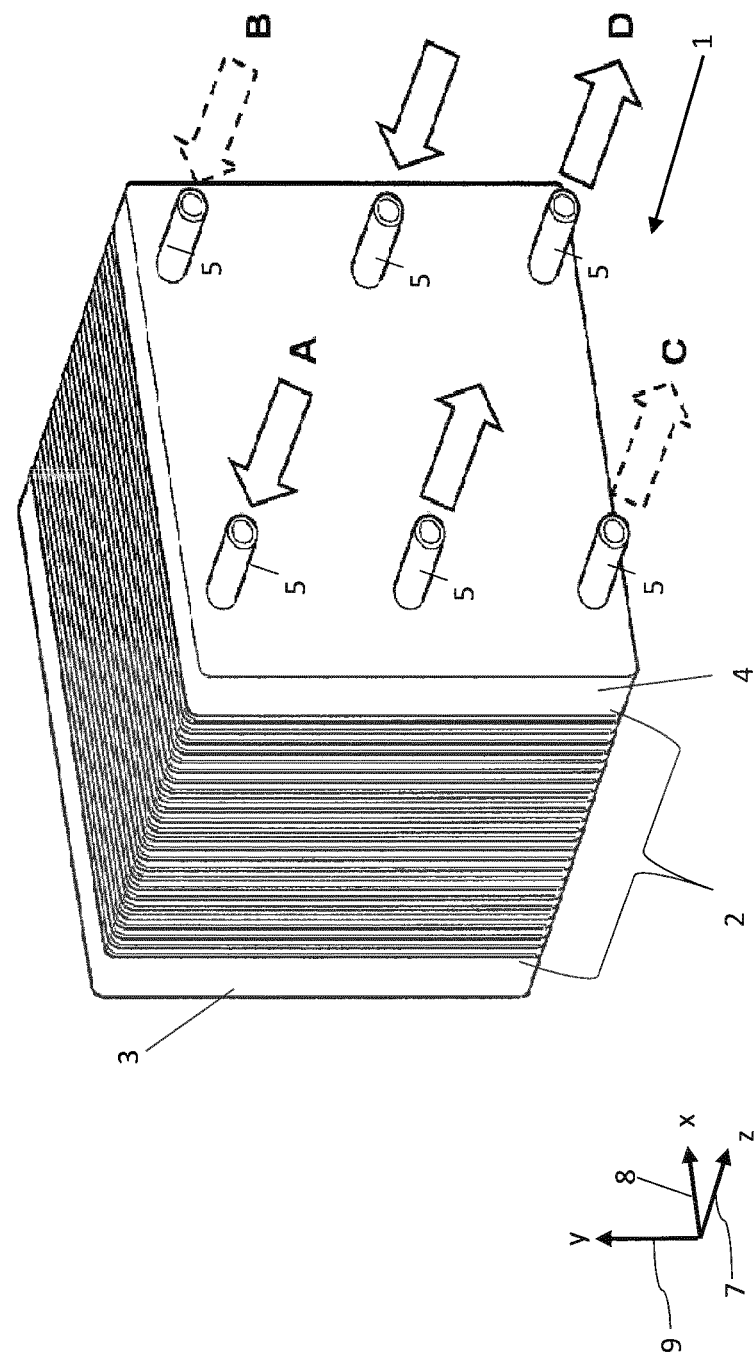
FIG. 1 schematically shows a perspective view of an electrochemical system comprising a plurality of bipolar plates.

FIG. 1 shows an electrochemical system 1 of the type provided here, comprising a plurality of identical metal separator plates 2, which are arranged in a stack and stacked along a z direction 7. The bipolar plates 2 of the stack are clamped between two end plates 3, 4. The z direction 7 is also referred to as the stacking direction. The bipolar plates 2 each comprise two metal separator plates which are connected to one another (see for example FIG. 2B). In the present example, the system 1 is a fuel cell stack. Two adjacent bipolar plates 2 of the stack thus between one another enclose an electrochemical cell, which is used, for example, for the conversion of chemical energy into electrical energy. The electrochemical cells usually each comprise a membrane electrode assembly (MEA), (see, for example, FIG. 2B). The MEAS typically each contain at least one membrane, for example, an electrolyte membrane. Furthermore, a gas diffusion layer (GDL) can be arranged on one or both surfaces of the MEA.

In alternative embodiments, the system 1 can likewise be formed as an electrolyzer, compressor, or as a redox flow battery. Bipolar plates can also be used in these electrochemical systems. The composition of these bipolar plates can then correspond to the composition of the bipolar plates 2 that are explained in greater detail here, even if the media guided on or through the bipolar plates in the case of an electrolyzer, in the case of an electrochemical compressor, or in the case of a redox flow battery, respectively, can differ from the media used for a fuel cell system. The same applies to the separator plates, in particular of a humidifier.

The z axis 7, together with an x axis 8 and a y axis 9, spans a right-handed Cartesian coordinate system. The end plate 4 includes a plurality of media connections 5, via which media are feedable to the system 1 and via which media are dischargeable from the system 1. These media that are feedable to the system 1 and dischargeable from the system 1 may, for example, include fuels such as molecular hydrogen or methanol, reaction gases such as air or oxygen, reaction products such as water vapor, or depleted fuels or coolants such as water and/or glycol.

FIG. 2A shows a section of a bipolar plate 2 known from the prior art in a top view, wherein the bipolar plate 2 according to FIG. 2A can be used, for example, in an electrochemical system of the type of the system 1 from FIG. 1. Here and hereafter, recurring features are denoted by the same reference numerals. The bipolar plate 2 is formed from two integrally joined individual plates or separator plates 2a, 2b, of which only the first separator plate 2a is visible in FIG. 2A, which hides the second separator plate 2b. The separator plates 2a, 2b can be made of a metal sheet, for example of exactly one stainless steel sheet. The separator plates 2a, 2b include mutually aligning through-openings, which form through-openings 11a, 11b, 11c of the bipolar plate 2. When a plurality of bipolar plates of the type of bipolar plate 2 are stacked, the through-openings 11a-c form ducts extending through the stack 2 in the stacking direction 7 (see FIG. 1). Typically, each of the ducts formed by the through-openings 11a-c is in fluid connection with one of the ports 5 in the end plate 4 of the system 1. For example, the ducts formed by the through-openings 11a, 11b are used to supply the electrochemical cells of the fuel cell stack 2 with fuel and with reaction gas. In contrast, coolant can be introduced into the stack 2 or removed from the stack 2 via the duct formed by the through-opening 11c.

So as to seal the through-openings 11a-c with respect to the inside of the stack 2 and with respect to the surrounding area, the first separator plate 2a comprises beads 12a, 12b, 12c, which are each arranged around the through-openings 11a-c and each completely enclose the through-openings 11a-c. On the rear side of the bipolar plate 2 facing away from the observer of FIG. 2A, the second separator plate 2b comprises appropriate beads for sealing the through-openings 11a-c (not shown).

In an electrochemically active region 18 of the bipolar plate 2, the first separator plate 2a on its front side, which faces the viewer of FIG. 2A, comprises a flow field 17 including structures for guiding a reaction medium along the front side of the separator plate 2a. These structures are provided in FIG. 2A by a plurality of webs, and channels extending between the webs and delimited by the webs. FIG. 2A only shows a section of the active region 18 on the front side of the bipolar plate 2. On the front side of the bipolar plate 2A facing the observer of FIG. 2, the first separator plate 2a moreover includes a distribution or collection region 20. The distribution or collection region 20 includes distribution structures that are configured to distribute a medium that, proceeding from the through-opening 11a, is introduced into the distribution or collection region 20 across the active area 18 and/or to collect or to pool a medium that, proceeding from the active area 18, flows toward the through-opening 11a. The distribution structures of the distribution or collection region 20 in FIG. 2A are likewise provided by webs, and channels extending between the webs and delimited by the webs.

The first separator plate 2a furthermore comprises a perimeter bead 12d which surrounds the flow field 17, the distribution or collection region 20, and the through-openings 11a, 11b, and seals these with respect to the through-opening 11c, that is, with respect to the coolant circuit, and with respect to the surrounding area of the system 1. Similarly to a bead referred to as a sealing bead here, a perimeter bead is thus a sealing element. The structures of the active region 18, the distribution structures of the distribution or collection region 20, and the beads 12a-d are formed in one piece with the separator plate 2a and integrally formed in the separator plate 2a, for example, in an embossing or deep drawing process.

By way of passages 13a through the bead 12a, the distribution channels of the distribution or collection region 20 of the first separator plate 2a are in fluid connection with the through-opening 11a or with the duct formed by the through-opening 11a through the stack 2. For the sake of clarity, only a few of the passages 13a through the bead 12a in FIG. 2A are denoted by reference numerals. Likewise, the distribution structures of the distribution or collection region 20 are in fluid connection with the structures or channels of the flow field 17. In this way, a medium guided through the through-opening 11a, by way of the passages 13a in the bead 12a and by way of the distribution structures of the distribution or collection region 20, can be introduced into the flow field 17 in the active region 18 of the bipolar plate 2.

The through-opening 11b, or the duct through the stack 2 formed by the through-opening 11b, in a corresponding manner is in fluid connection with a distribution and collection region, and, by way of the same, is in fluid connection with a flow field on the rear side of the bipolar plate 2 which faces away from the observer of FIG. 2A. In contrast, the through-opening 11c, or the duct through the stack 2 formed by the through-opening 11c, is in fluid connection with a cavity 22 that is enclosed or surrounded by the separator plates 2a, 2b and which is formed to guide a coolant through the bipolar plate 2.

The passages 13a through the bead 12a, at the end thereof acing away from the through-opening 11a, each include a first passage opening 13a', and, at the end thereof facing the through-opening 11a, each include a second passage opening 13a". A shortest straight connecting line between the second passage opening 13a" and the first passage opening 13a' is defined for each of the passages 13a through the bead 12a in a first direction 14a (short dotted arrow), which represents an orientation of the respective passage 13a. And a shortest straight connecting line between the first passage opening 13a' and an inlet or outlet 16 of the active region 18 defines a second direction 15a for each of the passages 13a through the bead 12a (dash-dotted arrow). The first directions 14a assigned to the passages 13a are each directed from the through-opening 11a toward the first passage opening 13a'. And the second directions 15a assigned to the passages 13a are each directed from the first passage opening 13a' toward the active region 18.

FIG. 2A shows, by way of example for one of the passages 13a through the bead 12a, the first and second directions 14a, 15a assigned to this passage 13a in each case as an arrow. The directions of the arrows do not necessarily have to reflect the flow direction of the medium. Depending on the use of the bipolar plate 2 or of the separator plate 2a according to FIG. 2A, medium can flow either in the direction of the arrow, that is, from the through-opening 11a toward the active region 18, or counter to the direction of the arrow, that is, from the active region 18 toward the through-opening 11a. It is evident that a first direction 14a and a second direction 15a are given in the same manner for the remaining passages 13a through the bead 12a shown in FIG. 2A, corresponding to the above-described definition.

In the bipolar plate 2 or separator plate 2a known from the prior art shown in FIG. 2A, the first and second directions 14a, 15a highlighted by arrows include an angle of approximately 20°, which is indicated by a dotted arch. For the passage through the bead 12a arranged furthest to the left in FIG. 2A, the angle between the first and second directions assigned to this passage is approximately 90 degrees. In other words, the passages 13a through the bead 12a, which surrounds and seals the through-opening 11a, are arranged on a side of the through-opening 11a or of the bead 12a which faces the active region 18. When medium, proceeding from the through-opening 11a, flows through the passages 13a, it thus, at that moment, flows toward the active region 18 or approximately toward the active region 18.

FIG. 2B shows a section through a stack comprising bipolar plates 2 of the type illustrated in FIG. 2A, wherein the cutting plane is given by the straight line A-A shown in FIG. 2A. Each of the bipolar plates 2 are formed from two joined metal separator plates 2a, 2b. For example, the separator plates 2a, 2b of the bipolar plates 2 can each be joined by welded connections, and in particular by laser welded connections. A respective electrochemical cell comprising a membrane 19, for example in the form of an electrolyte membrane, is arranged between adjacent bipolar plates 2 of the stack. In addition, in each case the beads 12a for sealing the through-opening 11a, the distribution or collection region 20 comprising distribution structures in the form of webs and channel, the active region 18, as well as the passages 13a through the beads 12a are highlighted, by way of which the through-opening 11a in each case is in fluid connection with the distribution or collection region 20 and with the active region 18. In the active region, gas diffusion layers 20a, 20b, which enhance the incident flow of the membrane 19 in the active region 18, are additionally arranged on both sides of the membrane 19. In addition, the first passage openings 13a' facing the active region 18, and the second passage openings 13a" of the passages 13a which face the through-opening 11a, are shown.

Figure 3A:
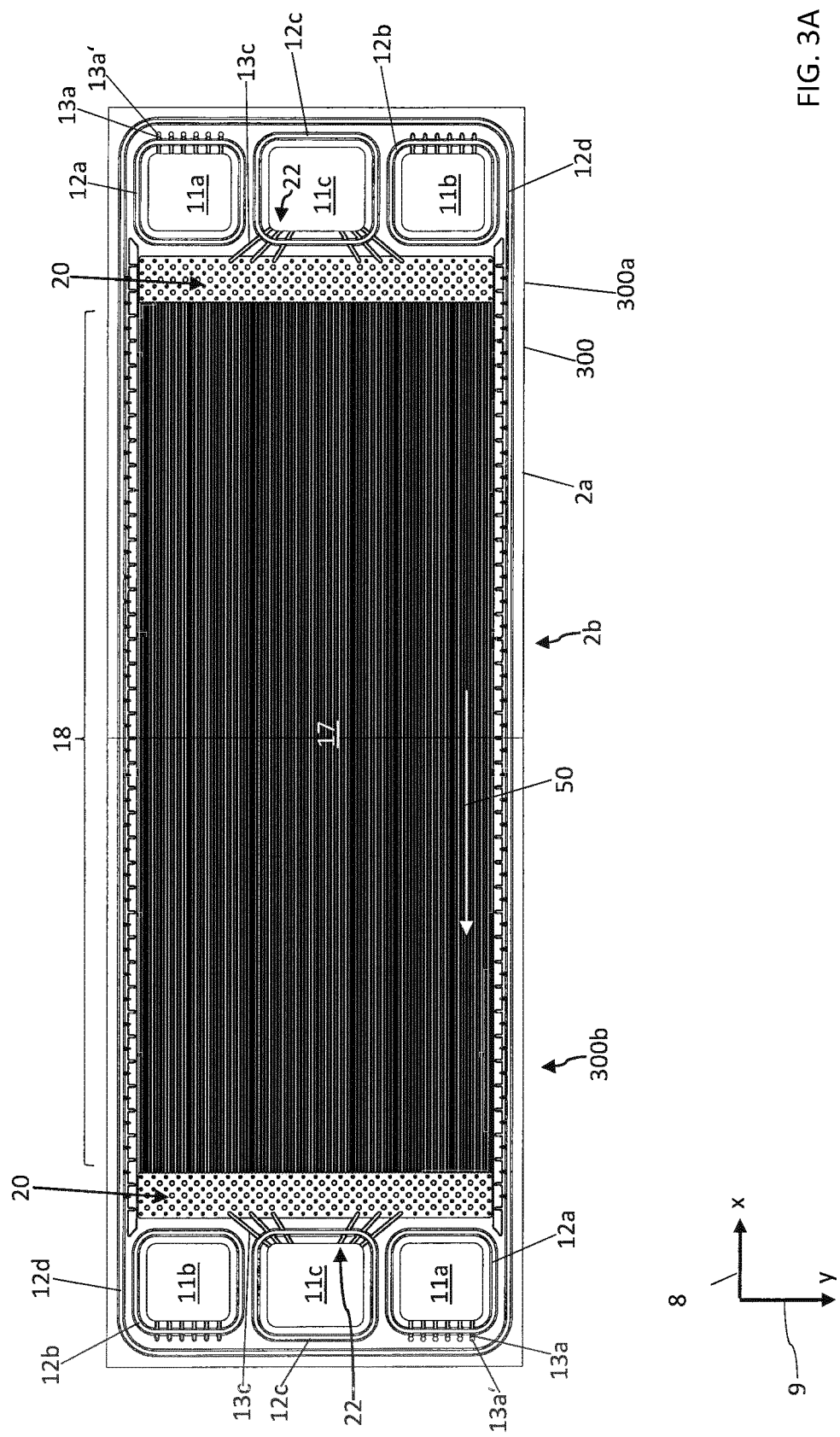
FIG. 3A schematically shows a separator plate of the type provided here according to a first embodiment in a top view.
Figure 3B:
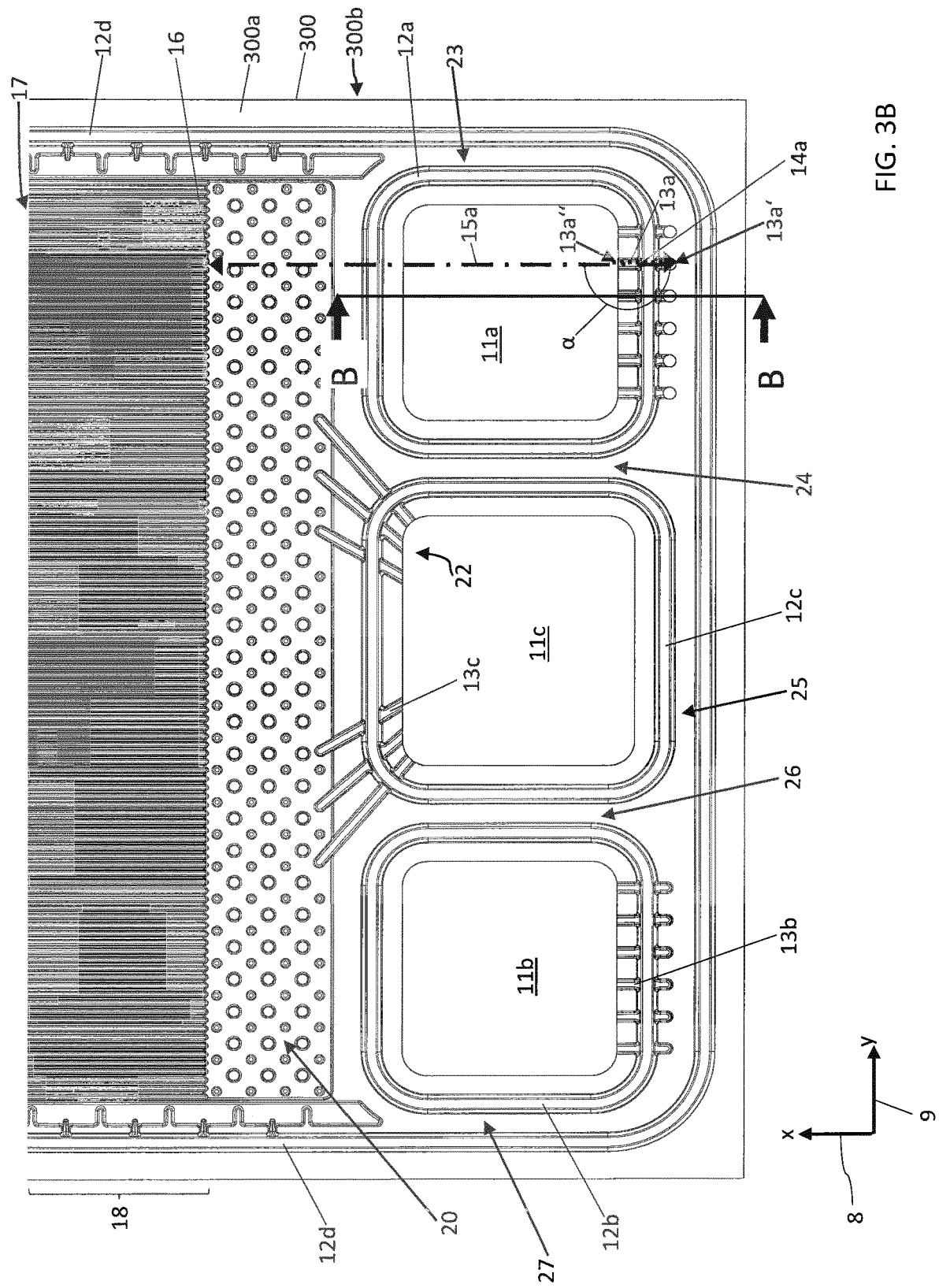
FIG. 3B schematically shows a detail of the separator plate from FIG. 3A in a top view.

FIG. 3A shows a bipolar plate 300 of the type provided here according to a first embodiment in a top view. FIG. 3B shows a section of the bipolar plate 300 according to FIG. 3A. And FIG. 3C shows a section through a stack of bipolar plates 300 of the type shown in FIGS. 3A and 3B, wherein a respective membrane 19, or the border region thereof, is arranged between adjacent bipolar plates of the stack. The cutting plane of the sectional illustration according to FIG. 3C is oriented perpendicular to the planar surface planes of the bipolar plates 300 of the stack, and thus perpendicular to the drawing planes of FIGS. 3A and 3B. The cutting plane of FIG. 3C extends along the line of intersection B-B highlighted in FIG. 3B. The stack of bipolar plates 300 according to FIG. 3C can be a stack of an electrochemical system of the type of the system 1 from FIG. 1, for example.

Similarly to the bipolar plate 2 according to FIG. 2A, the bipolar plate 300 according to FIGS. 3A-C is joined from exactly two metal separator plates 300a, 300b, wherein the separator plate 300b is hidden by the separator plate 300a facing the observer of FIGS. 3A, 3B. The separator plates 300a, 300b of the bipolar plate 300 can, for example, each be formed of a stainless steel sheet having a thickness of less than 100 μm. The bipolar plate 300 has a rectangular shape, wherein a length of the bipolar plate 300 is approximately three times a width of the bipolar plate 300.

The bipolar plate 300 includes through-openings 11a-c for conducting media through the bipolar plate 300. The through-openings 11a-c denoted by identical reference numerals are in each case in fluid connection with one another on opposing sides or ends of the bipolar plate 300. A sealing bead 12a, 12b, 12c, formed for sealing the through-openings 11a-c, surrounds each of the through-openings 11a-c. Moreover, the separator plate 300a of the bipolar plate 300 comprises a perimeter bead 12d. In contrast to the perimeter bead 12d of the bipolar plate 2 according to FIG. 2A, the perimeter bead 12d of the bipolar plate 300 according to FIGS. 3A-C not only surrounds the active region 18, the distribution or collection regions 20, and the through-openings 11a and 11b, but additionally also surrounds the through-openings 11c, thus enclosing all of the through-openings 11a-11c.

In the separator plate 300a of the bipolar plate 300 according to FIGS. 3A-C, the first through-openings denoted by reference numeral 11a are in fluid connection with one another by way of passages 13a through the sealing beads 12a, by way of the distribution and collection regions 20, and by way of the active region 18. The active region 18 of the separator plate 300a of the bipolar plate 300 has a rectangular or substantially rectangular shape, wherein the borders of the active region 18 extend parallel to the lateral edges of the bipolar plate 300. The active region 18 comprises structures for guiding a reaction medium along the outer surface of the bipolar plate 300, wherein the structures of the active region 18 on the bipolar plate 300 encompass channels and webs, thereby resulting in an overall media flow direction 50. However, it is also conceivable that the structures of the active region 18 are provided in a different form than by webs and channels in modified embodiments.

In contrast to the bipolar plate 2 according to FIG. 2A, the distribution or collection regions 20 of the separator plate 300a of the bipolar plate 300 according to FIGS. 3A, 3B each likewise have a rectangular or substantially rectangular shape, wherein the borders of the distribution or collection regions 20 extend parallel to the lateral edges of the bipolar plate 300. The distribution and collection regions 20 comprise distribution structures, which are formed to distribute medium flowing from the through-opening 11a to the active region 18 as homogeneously as possible across the active region 18, or to collect medium flowing from the active region 18 to the through-opening 11a. The distribution structures of the distribution or collection regions 20 comprise nub-like elevations on the separator plate 300a of the bipolar plate 300. In a plane parallel to the planar surface plane of the bipolar plate 300, or parallel to the planar surface planes of the separator plates 300a, 300b, the nub-like elevations, for example, have a round or substantially round cross-section. However, it is conceivable that the distribution structures of the distribution or collection regions 20, in modified embodiments, are provided in a different form than by nub-like elevations; for example, they can likewise encompass webs and channels.

In the case of the separator plate 300a of the bipolar plate 300, the second through-openings denoted by reference numeral 11c are in fluid connection with one another by way of passages 13c through the sealing beads 12c, and by way of a cavity 22 enclosed by the separator plates 300a, 300b of the bipolar plate 300. The cavity 22 is used to guide coolant through the bipolar plate 300 and is delimited by a rear side of the active region 18 of the separator plate 300a which faces the cavity 22. Coolant guided through the cavity 22 can thus be used in particular for cooling the active region 18. Each of the passages 13c through the sealing beads 12c, which each form a fluid connection between the through-opening 11c and the cavity 22 enclosed between the separator plates 300a, 300b, opens into the through-opening 11c on a side of the through-opening 11c which faces the active region 18. This ensures as direct a fluid connection as possible between the through-opening 11c and the cavity 22, which is delimited at least in sections, or even for the most part, by a rear side of the active region 18 which faces the cavity 22.

The through-openings of the separator plate 300a of the bipolar plate 300 denoted by reference numeral 11b are in fluid connection with one another by way of passages 13b through the sealing beads 12b, and by way of distribution and collection regions, as well as by way of an active region of the separator plate 300b, which is hidden in FIG. 3A.

The structures of the active region 18, the distribution structures of the distribution or collection regions 20, and the sealing beads 12a-d can be formed in one piece with the separator plate 300a of the bipolar plate 300. For example, they can each be molded into the separator plate 300a, in particular by embossing or by deep drawing. The same can apply to the active region, the distribution structures, and the sealing beads of the separator plate 300b of the bipolar plate 300, which is hidden in FIGS. 3A, 3B.

In the separator plate 300a of the bipolar plate 300, the distribution or collection regions 20 are each arranged between the through-openings 11a-c and the active region 18. In particular, a respective distribution or collection region 20 is arranged between the through-opening 11a and the active region 18, so that medium flowing from the through-opening 11a to the active region 18, or medium flowing from the active region 18 to the through-opening 11a, in each case flows through one of the distribution or collection regions 20.

The through-openings 11a-c of the bipolar plate 300, or of the separator plates 300a, 300b of the bipolar plate 300, each have a substantially rectangular shape, and in FIGS. 3A, 3B in particular a square or substantially square shape, wherein the lateral edges of the through-openings 11a-c are oriented parallel to the lateral edges of the bipolar plate 300. Along the y direction 9, and thus transversely to the longitudinal direction of the bipolar plate 300, the through-openings 11a-c are arranged next to one another, and along the x direction 8, they are oriented symmetrically or substantially symmetrically with respect to one another.

The separator plate 300a of the bipolar plate 300 according to FIGS. 3A-C differs from the separator plate 2A of the bipolar plate 2 according to FIG. 2A in particular by the arrangement and orientation of the passages 13a, which establish a fluid connection between the through-opening 11a and the active region 18. On the separator plate 300a according to FIGS. 3A-C, the passages 13a, in contrast to the separator plate 2a according to FIG. 2A, are arranged on a side of the through-opening 11a or of the sealing bead 12a which faces away from the active region 18.

As has been described in connection with FIG. 2A, the orientation of the passages 13a can be described by a first direction 14a. For each of the passages 13a, the first direction 14a is given by a shortest straight connecting line between the passage openings 13a', 13a" and is directed in each case from the through-opening 11a toward the first passage opening 13a', wherein the first passage opening 13a' forms an end of the passage 13a which faces away from the through-opening 11a. FIG. 3B shows the first direction 14a by way of example for one of the passages 13a as a directed dotted arrow, which points in the negative x direction 8, and thus in a direction facing away from the active region 18. As has been described in connection with FIG. 2A, medium can flow through the passages 13a both in the direction of the arrow or also counter to the direction of the arrow.

A second direction 15a is shown for the same through-opening 13a in FIG. 3B. The second direction 15a is given by a shortest straight connecting line between the first through-opening 13a' and an inlet or outlet 16 of the active region 18, and is directed from the first through-opening 13a' toward the active region 18. FIG. 3B also shows the second direction 15a as a dash-dotted arrow, which points in the positive x direction 8, and thus toward the active region 18.

In contrast to the separator plate 2a according to FIG. 2A, the first direction 14a and the second direction 15a include an angle of at least 100 degrees, and here in particular of 180 degrees, on the separator plate 300a according to FIG. 3B. The same applies to the passages 13b through the sealing bead 12b, which open into the outer side of the bipolar plate 300, that is, on the separator plate 300b, which faces away from the observer of FIGS. 3A, 3B. The consequence of this orientation of the through-openings 13a of the separator plate 300a is, for example, that medium flowing from the through-opening 11a through the through-openings 13a to the active region undergoes a considerable change in the flow direction thereof (in FIG. 3B by 180 degrees), and can thus be distributed particularly well across the active region 18. In this way, for example, the distribution or collection regions 20 can be formed to have a smaller surface area, and the active region 18 to have a larger surface area. As a result, the efficiency of the electrochemical system 1 comprising the bipolar plate 300 can be improved. On the separator plates 300a according to FIGS. 3A-C, the passages 13a are in fluid connection with the active region 18 in particular by way of channels that are delimited by the sealing beads 12a-d, for example by way of a channel 23 between the sealing bead 12a and the perimeter bead 12d, by way of a channel 24 between the sealing beads 12a and 12c, by way of a channel 25 between the sealing bead 12c and the perimeter bead 12d, by way of a channel 26 between the sealing beads 12b and 12c, as well as by way of a channel 27 between the sealing bead 12b and the perimeter bead 12d. The channel 23 between the sealing bead 12c and the perimeter bead 12d is also shown in a sectional view in FIG. 3C, wherein it is not provided with a dedicated reference numeral for each bipolar plate.

The portion of a sectional illustration shown in FIG. 3C can continue toward the left, analogously to FIG. 2B, in the region extending to the left of the bead 12a, that is, the walls of the bipolar plate which delimit the channels 23 to 26, similarly to the beads 12a to 12d, the passages 13a, 13a', 13a", and the walls delimiting the channels of the flow field 17, are directly molded into one of the separator plates of the bipolar plate. The bipolar plate thus does not require any separately produced sealing elements or the like that are attached to the plates.

Figure 4:
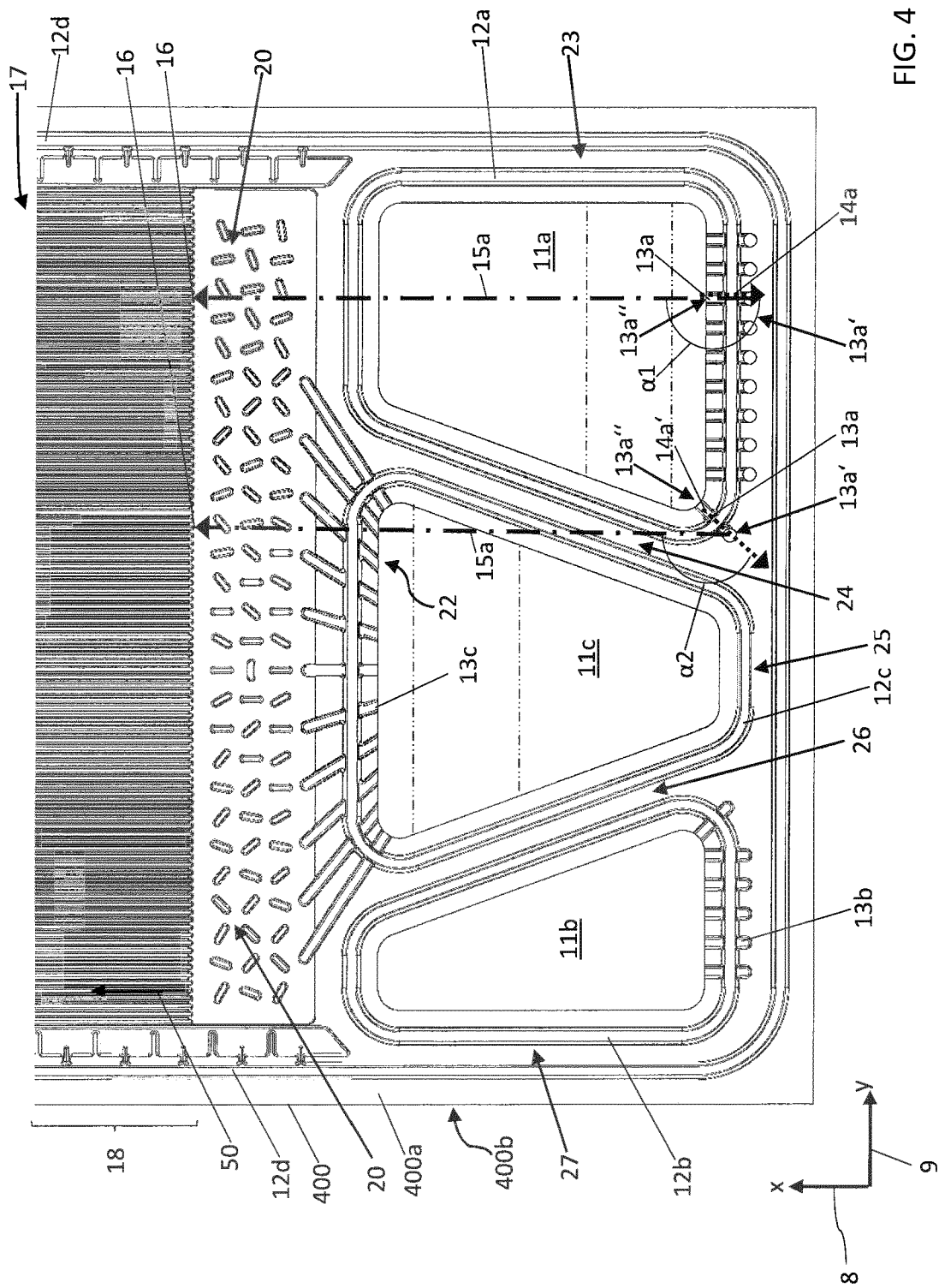
FIG. 4 schematically shows a second embodiment of a separator plate of the type provided here, in a top view.

FIG. 4 shows a detail of a bipolar plate 400 of the type provided here according to a second embodiment in a top view. The bipolar plate 400 according to FIG. 4 is a modification of the bipolar plate 300 according to FIGS. 3A-C. For the sake of simplicity, hereafter primarily only the differences between the bipolar plates 300 and 400 will be highlighted.

Similarly to the bipolar plate 300, the bipolar plate 400 is also formed of exactly two joined metal separator plates 400a, 400b, wherein the separator plate 400b in FIG. 4 is hidden by the separator plate 400a. The bipolar plate 400 also includes passages 13a through the sealing bead 12a, which are arranged on a side of the through-opening 11a, or of the sealing bead 12a, which faces away from the active region 18 of the bipolar plate 400. In addition to passages 13a, in which the first direction 14a includes an angle α1 of 180 degrees with the second direction 15a, similarly to the bipolar plate 300, the bipolar plate 400, in contrast to the bipolar plate 300, however, additionally comprises a passage 13a in which the first direction 14a' includes a slightly smaller angle α2 of approximately 135 degrees with the second direction 15a. In FIG. 4, this is the passage 13a through the sealing bead 12a arranged furthest to the left.

The bipolar plate 400 according to FIG. 4 furthermore differs from the bipolar plate 300 according to FIGS. 3A-C in the shape of the through-openings 11a-c, which have a trapezoidal shape or substantially a trapezoidal shape in the case of the bipolar plate 400, wherein the parallel extending edges of the through-openings 11a-c are each oriented parallel to the y direction 9, and thus transversely or perpendicularly to the longitudinal direction of the bipolar plate 400.

The through-opening 11c, which can, for example, be part of a coolant circuit of the system 1 from FIG. 1 comprising the bipolar plate 400, has a cross-section that is determined parallel to the planar surface plane of the bipolar plate 400 and in the y direction 9, and that continuously increases along the x direction 8 from an end of the through-opening 11c which faces away from the active region 18 toward an end of the through-opening 11c which faces the active region 18. Considering the radii at which the lateral edges of the through-openings transition into one another, the cross-section increases strictly monotonically, at least in a region that extends on a straight line, which runs parallel to the overall media flow direction 50 of the active region, between approximately 5% and 95% of the extension of the first through-opening toward the active region, and thus also between 60% and 90% of this extension, that is, between the two double dash-dotted lines. In this way, it can be ensured that the bipolar plate 400 is supplied with coolant particularly well. For example, the flow cross-section of all passages 13c through the sealing bead 12c on the bipolar plate 400 according to FIG. 4 is increased compared to a comparable bipolar plate from the prior art, but also compared to the bipolar plate 300 according to FIGS. 3A-C.

And the through-openings 11a, 11c, which are used, for example, to supply the electrochemical cells adjoining the bipolar plate 400 with reaction medium, each have a cross-section that is determined parallel to the planar surface plane of the bipolar plate 400 and in the y direction 9, and that continuously increases along the x direction 8 from an end of the through-openings 11a, 11c which faces the active region 18 to an end of the through-openings 11a, 11c which faces away from the active region 18, apart from the terminating radii. Considering the radii at which the lateral edges of the through-openings transition into one another, the cross-section decreases strictly monotonically, at least in a region that extends on a straight line, which runs parallel to the overall media flow direction 50 of the active region, between approximately 5% and 95% of the extension of the first through-opening to the active region, and thus also between 10% and 40% of this extension, that is, between the two double dash-dotted lines. In this way, the side of the through-openings 11a, 11b, or of the sealing beads 12a, 12b, which faces away from the active region 18 is longer on the bipolar plate 400 than on the bipolar plate 300 and can, for example, include a larger number of passages 13a, 13b. This can improve the supply of the active region 18 with reaction medium, and thus the efficiency of the electrochemical system 1 comprising the bipolar plate 400.

Another difference between the bipolar plate 400 and the bipolar plate 300 is that the distribution structures of the distribution or collection region 20 of the bipolar plate 400 parallel to the planar surface plane of the bipolar plate 400 each have an elongated cross-section. This cross-section can, for example, have a substantially rectangular, oval or other shape.

Figure 5:
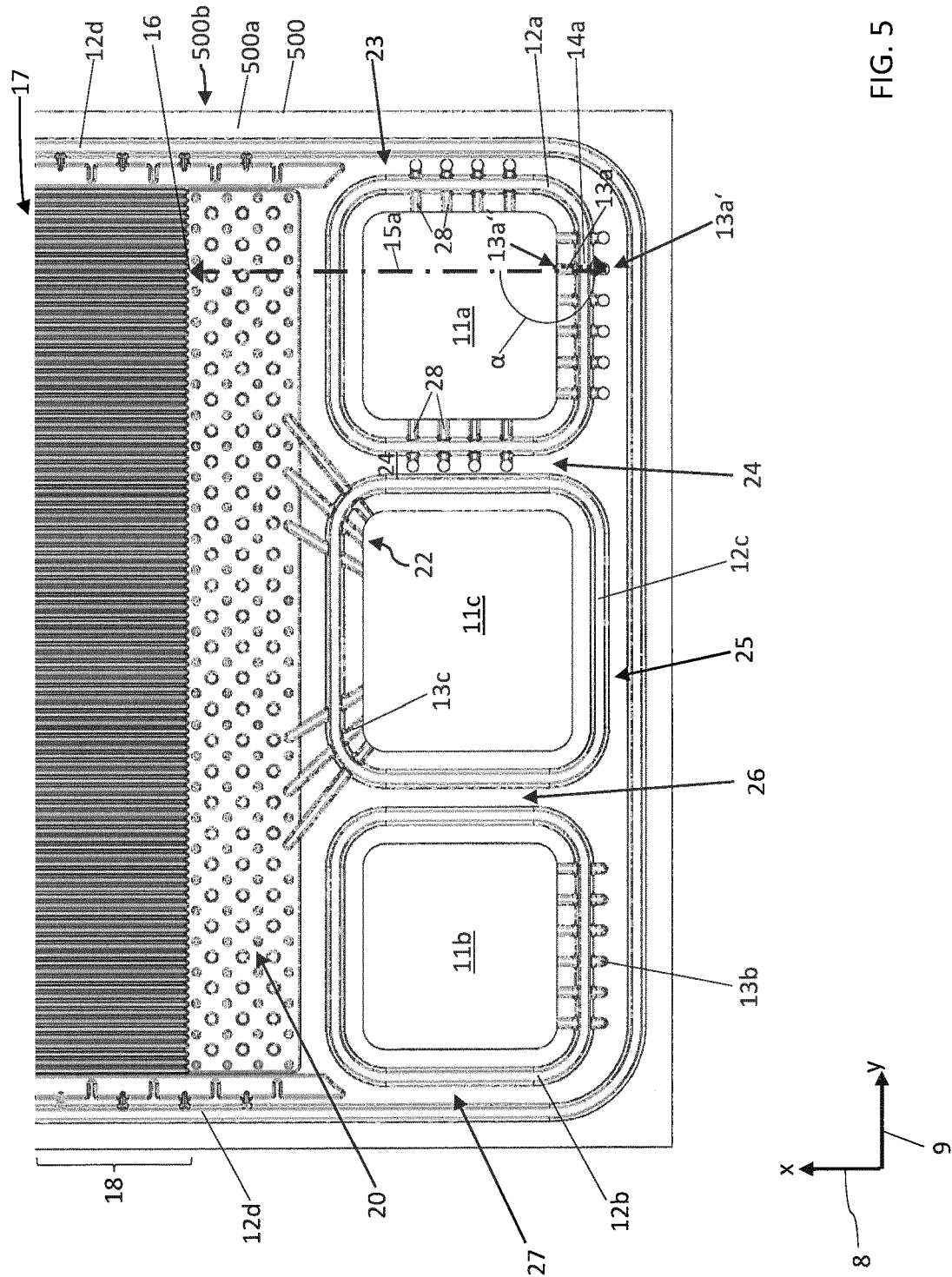
FIG. 5 schematically shows a third embodiment of a separator plate of the type provided here, in a top view.

FIG. 5 shows a detail of a bipolar plate 500 of the type provided here according to a third embodiment in a top view. The bipolar plate 500 according to FIG. 5 is a modification of the bipolar plate 300 according to FIGS. 3A-C. For the sake of simplicity, hereafter primarily only the differences between the bipolar plates 300 and 500 will be highlighted.

Similarly to the bipolar plate 300, the bipolar plate 500 is also formed from two joined metal separator plates 500a, 500b, wherein the separator plate 500b in FIG. 5 is hidden by the separator plate 500a. An angle a between the first direction 14a and the second direction 15a is again 180 degrees.

The bipolar plate 500 according to FIG. 5 differs from the bipolar plate 300 according to FIGS. 3A-C in that the separator plate 500a includes additional passages 28 through the sealing bead 12a surrounding the through-opening 11a. The passages 28 are oriented parallel to the y axis 9. The passages 28 can further improve the supply of the active region 18 with reaction medium or the discharge of reaction medium from the active region.

Figure 6:
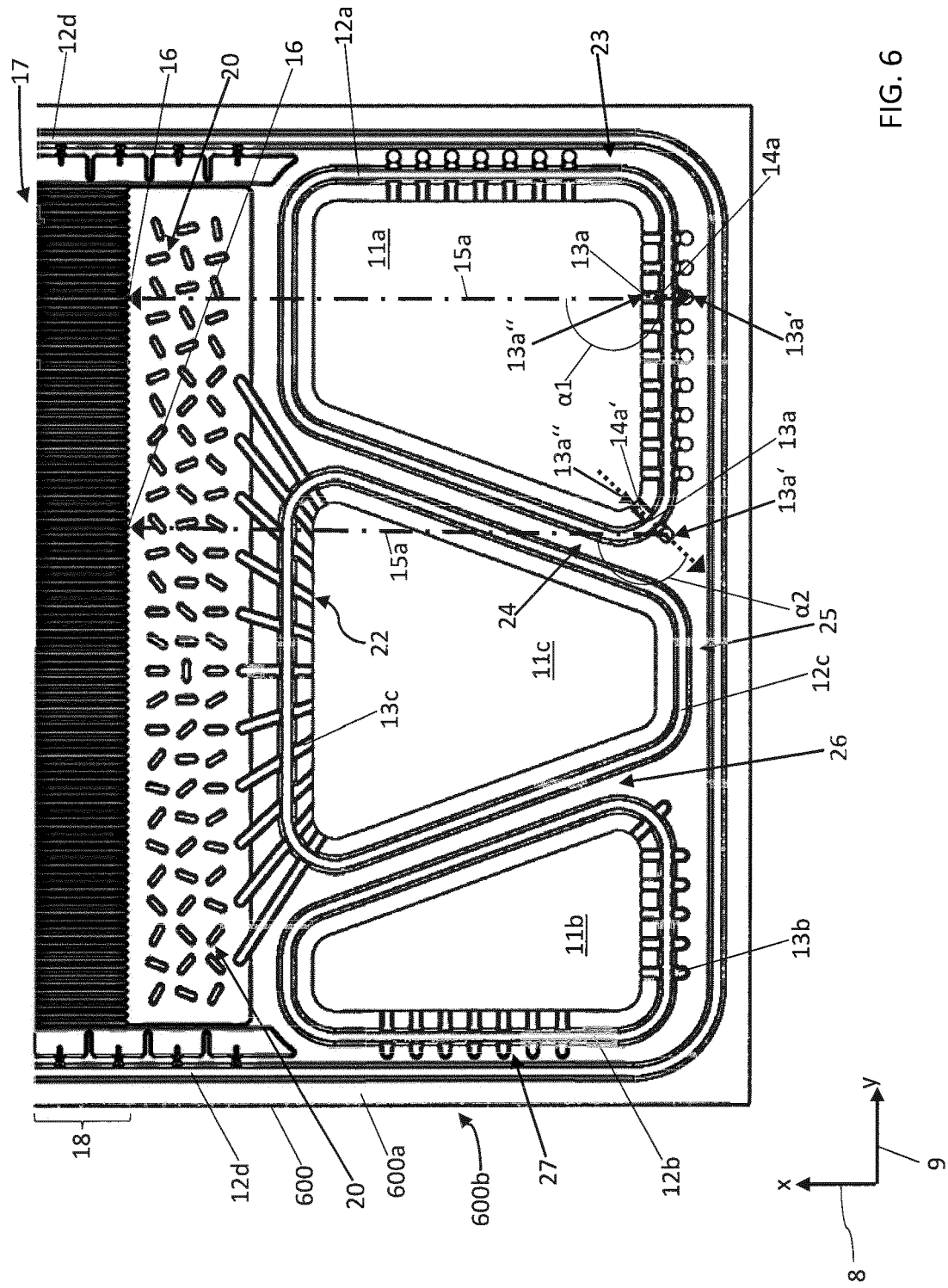
FIG. 6 schematically shows a fourth embodiment of a separator plate of the type provided here, in a top view.

FIG. 6 shows a detail of a bipolar plate 600 of the type provided here according to a fourth embodiment in a top view. The bipolar plate 600 according to FIG. 6 is a modification of the bipolar plate 400 according to FIG. 4. For the sake of simplicity, primarily only the differences between the bipolar plates 400 and 600 will be highlighted.

Similarly to the bipolar plate 400, the bipolar plate 600 is also formed from two joined metal separator plates 600a, 600b, wherein the separator plate 600b in FIG. 6 is hidden by the separator plate 600a.

The bipolar plate 600 according to FIG. 6 differs from the bipolar plate 400 according to FIG. 4 in that the separator plate 600a includes additional passages 28 through the sealing bead 12a surrounding the through-opening 11a, and additional passages 29 through the sealing bead 12b surrounding the through-opening 11b. The passages 28 and 29 are each oriented parallel to the y axis 9. The passages 28 can further improve the supply of the active region 18 with reaction medium or the discharge of reaction medium from the active region 18. Accordingly, the passages 29 can further improve the supply of an active region of the separator plate 600b with reaction medium, and the discharge of reaction medium from the active region of the separator plate 600b. The angles $\alpha 1$ and $\alpha 2$ between the first direction 14a and second direction 15a assigned to the particular passage 13a are highlighted by way of example in FIG. 6 for two of the passages 13a through the sealing bead 12a of the through-opening 11a. Similarly to the bipolar plate 400 according to FIG. 4, the angles $\alpha 1$ and $\alpha 2$ on the bipolar plate 600 according to FIG. 6 are 180 degrees and approximately 135 degrees.

Figure 7:
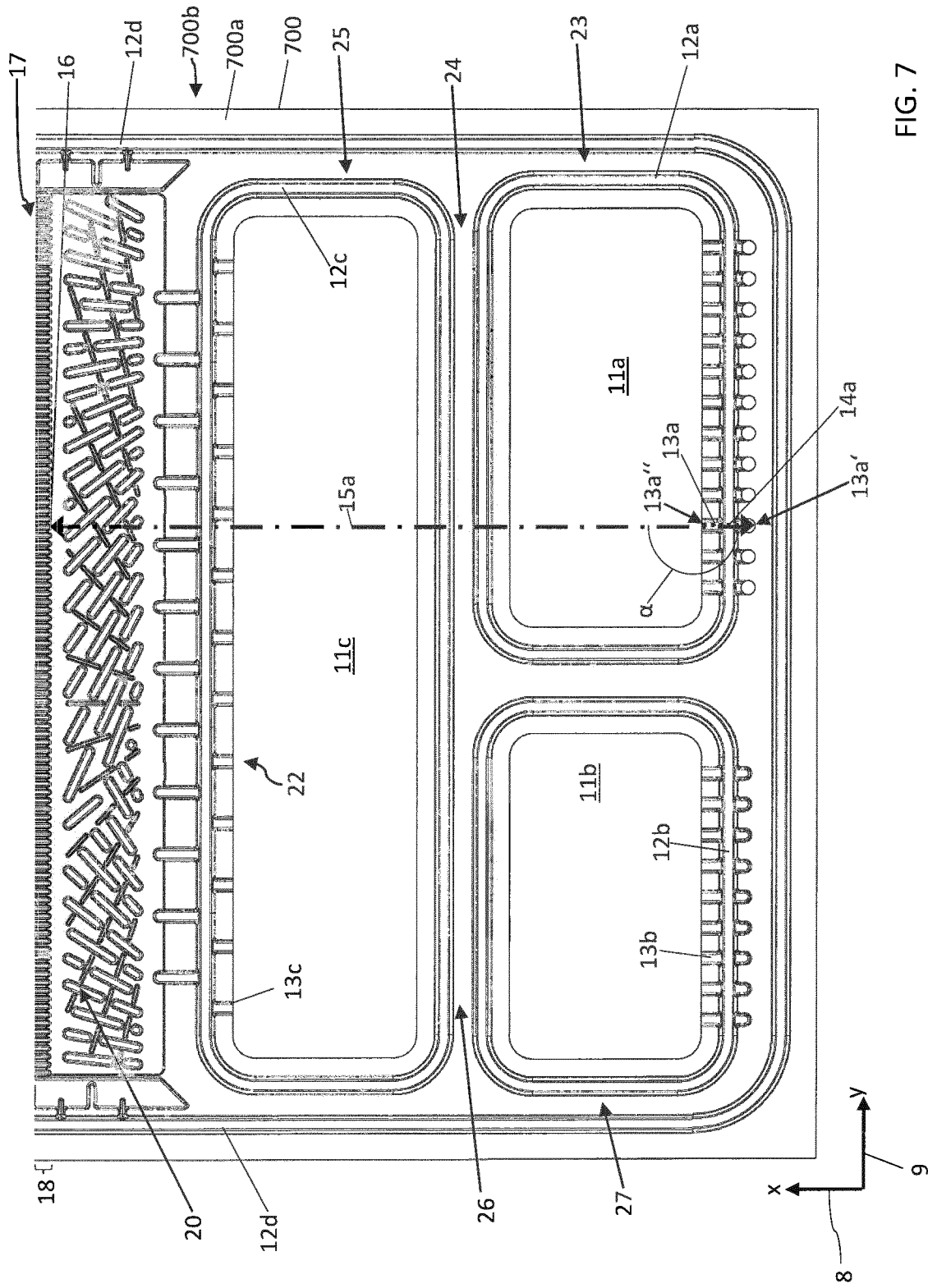
FIG. 7 schematically shows a fifth embodiment of a separator plate of the type provided here, in a top view.

FIG. 7 shows a detail of a bipolar plate 700 of the type provided here according to a fifth embodiment in a top view. The bipolar plate 700 according to FIG. 7 is a modification of the bipolar plate 300 according to FIGS. 3A-C. For the sake of simplicity, hereafter primarily only the differences between the bipolar plates 300 and 700 will be highlighted.

Similarly to the bipolar plate 300, the bipolar plate 700 is also formed from two joined metal separator plates 700a, 700b, wherein the separator plate 700b in FIG. 7 is hidden by the separator plate 700a.

The bipolar plate 700 according to FIG. 7 primarily differs from the bipolar plate 300 according to FIGS. 3A-C in the arrangement of the through-openings 11a-c. In contrast to the bipolar plate 300, the through-opening 11c in the bipolar plate 700 is arranged between the through-openings 11a and 11b and the active region 18. The through-opening 11c of the bipolar plate 700 can, for example, be part of a cooling circuit of the electrochemical system 1 from FIG. 1 comprising the bipolar plate 700. And the through-openings 11a, 11b can be used to supply the electrochemical cells adjoining the bipolar plate 700 with reaction gases. In contrast to the bipolar plate 300 according to FIGS. 3A-C, the through-opening 11c in the bipolar plate 700 according to FIG. 7 extends along the y direction 9 across the entire width of the distribution or collection region 20, or across the entire width of the active region 18. This can improve the supply of the cavity 22 with coolant or the discharge of coolant from the cavity 22 via the through-opening 11c. The angle α between the first direction 14a and second direction 15a assigned to this passage 13a is highlighted by way of example in FIG. 7 for one of the passages 13a through the sealing bead 12a of the through-opening 11a. This angle α is again 180 degrees here.

Finally, the distribution structures of the distribution or collection region 20 of the bipolar plate 700 according to FIG. 7, similarly to the bipolar plate 400 according to FIG. 4, have an elongated cross-section parallel to the planar surface plane of the bipolar plate 700. The distribution structures of the distribution or collection region 20 of the bipolar plate 700, however, comprise both elevations, which in the direction of the active region 18, based on the lateral edges of the bipolar plate 700, are directed from the outside to the inside, and depressions, which are directed from the inside to the outside, wherein the depressions are primarily used to distribute coolant across the cavity 22 on the rear side of the separator plate 700a which faces the cavity 22, so as to ensure as even cooling as possible of the active region 18.

Figure 8:
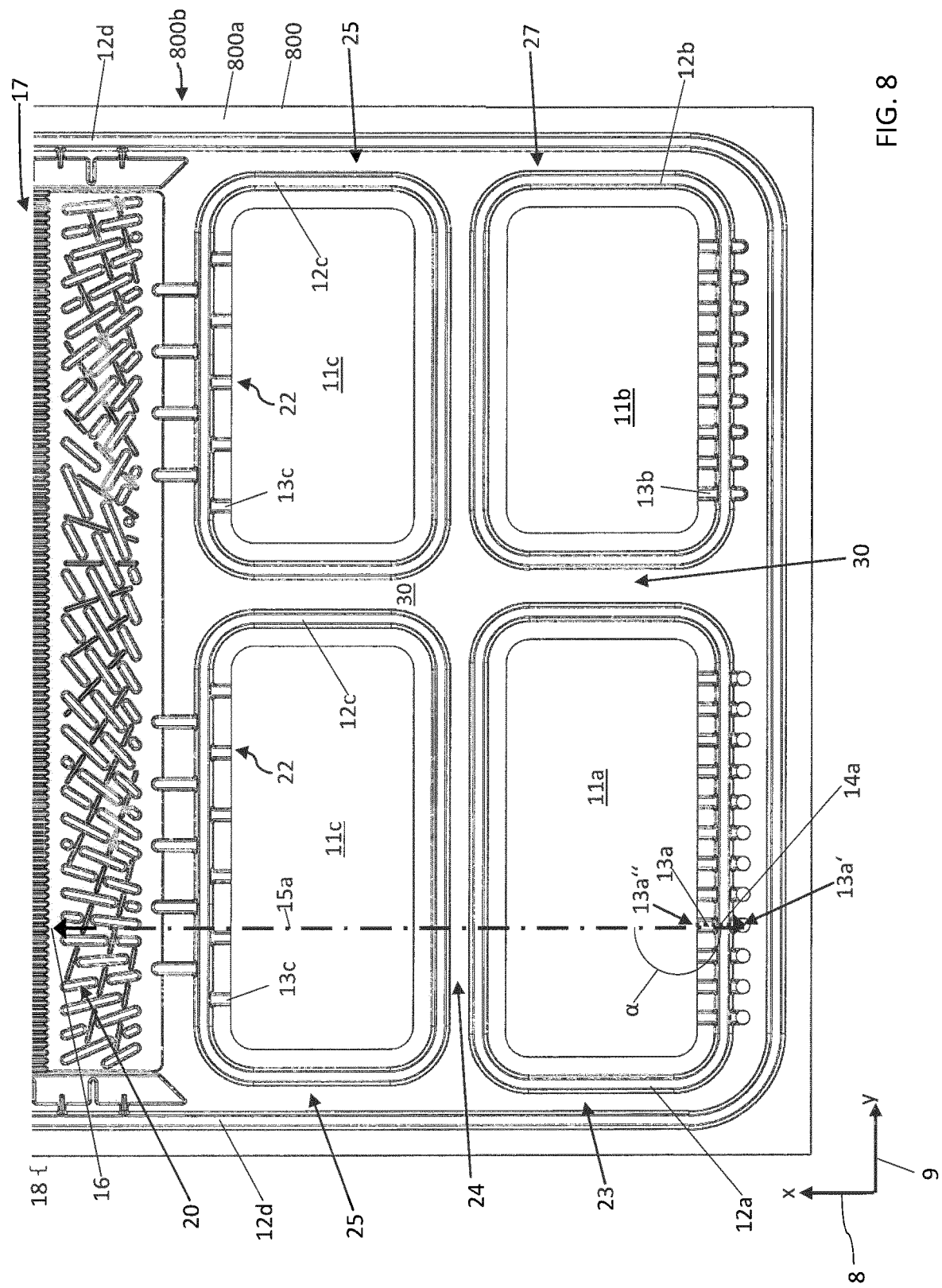
FIG. 8 schematically shows a sixth embodiment of a separator plate of the type provided here, in a top view.

FIG. 8 shows a detail of a bipolar plate 800 of the type provided here according to a sixth embodiment in a top view. The bipolar plate 800 according to FIG. 8 is a modification of the bipolar plate 700 according to FIG. 7. For the sake of simplicity, primarily only the differences between the bipolar plates 800 and 700 will be highlighted.

Similarly to the bipolar plate 700, the bipolar plate 800 is also formed from two joined metal separator plates 800a, 800b, wherein the separator plate 800b in FIG. 8 is hidden by the separator plate 800a.

The bipolar plate 800 according to FIG. 8 differs from the bipolar plate 700 according to FIG. 7 in that two separate through-openings 11c are provided between the through-openings 11a, 11b and the active region 18, which are each surrounded by a sealing bead 12c and in fluid connection with the cavity 22 enclosed by the separator plates 800a, 800b by way of passages 13c through the particular sealing bead 12c. Compared to the bipolar plate 700, in which only a single through-opening 11c is provided, which extends along the y direction 9 across the entire width of the distribution or collection region 20, or of the active region 18, this can have the advantage that reaction medium flowing between the through-opening 11a and the active region 18 can also flow through a channel 30 in the central portion of the separator plate 800a, which is delimited by the two separate sealing beads 12c. The distribution of reaction medium flowing from the through-opening 11a to the active region 18 onto the active region, or the collection of reaction medium flowing from the active region 18 to the through-opening 11a, can thus be further improved.

The invention claimed is:

1. A separator plate for an electrochemical system, comprising:
   at least one first through-opening for conducting a reaction medium through the separator plate;
   an active region including structures for guiding the reaction medium along a flat side of the separator plate; and
   a first sealing structure surrounding the first through-opening for sealing the first through-opening,
   the first sealing structure including a first passage for conducting the reaction medium through the first sealing structure,
   the first passage including a first passage opening facing away from the first through-opening,
   the first passage defining a first direction directed from the first through-opening toward the first passage opening; and
   the first through-opening being in fluid connection with the active region by way of the first passage,
   wherein the first passage is arranged and formed in such a way that the first direction includes an angle of at least 100 degrees with a second direction, the second direction being defined by a shortest straight connecting line connecting the first passage opening of the first passage to a media inlet or outlet of the active region, and the second direction being directed from the first passage opening of the first passage to the media inlet or outlet of the active region.

2. The separator plate according to claim 1, wherein the first passage has a second passage opening facing the first through-opening, and the first direction is defined by a shortest straight through-conduction line connecting the second passage opening to the first passage opening.

3. The separator plate according to claim 1, wherein the first passage is arranged and formed in such a way that the first direction, together with the second direction, includes an angle of at least 105 degrees.

4. The separator plate according to claim 1, comprising at least one second through-opening for conducting a coolant or a reaction medium through the separator plate, and comprising a second sealing structure surrounding the second through-opening for sealing the second through-opening.

5. The separator plate according to claim 4, wherein the separator plate is formed from metal.

6. The separator plate according to claim 5, wherein the first sealing structure and/or the second sealing structure is/are formed as sealing beads embossed into the separator plate, or are formed as a sealing bead embossed into the separator plate.

7. The separator plate according to claim 1, comprising a distribution region arranged between the first through-opening and the active region, wherein the first passage opening of the first passage is in fluid connection with the active region by way of the distribution region, the distribution region comprising distribution structures which are configured to distribute, across the active region, the reaction medium that, proceeding from the first passage opening of the first passage, is introduced into the distribution region, and/or to collect/pool, toward the first passage opening, the reaction medium that, proceeding from the active region, flows toward the first passage opening of the first passage.

8. The separator plate according to claim 1, wherein the first passage opening is formed as a through-window or as a through-hole in the separator plate.

9. A bipolar plate, comprising:
   a first separator plate and a second separator plate each made of metal, the first separator plate comprising:
   at least one first through-opening for conducting a reaction medium through the first separator plate;
   an active region including structures for guiding the reaction medium along a flat side of the first separator plate; and
   a first sealing structure surrounding the first through-opening for sealing the first through-opening,
   the first sealing structure including a first passage for conducting the reaction medium through the first sealing structure,
   the first passage including a first passage opening facing away from the first through-opening, the first passage defining a first direction directed from the first through-opening toward the first passage opening; and the first through-opening being in fluid connection with the active region by way of the first passage, wherein the first passage is arranged and formed in such a way that the first direction includes an angle of at least 100 degrees with a second direction, the second direction being defined by a shortest straight connecting line connecting the first passage opening of the first passage to a media inlet or outlet of the active region, and the second direction being directed from the first passage opening of the first passage to the media inlet or outlet of the active region, wherein the first separator plate and the second separator plate are connected to one another, the second separator plate likewise including a first through-opening, which is aligned with the first through-opening of the first separator plate, and the mutually aligned first through-openings of the first separator plate of the second separator plate forming a first through-opening of the bipolar plate.

10. The bipolar plate according to claim 9, wherein the second separator plate is formed from exactly one layer of a metal sheet.

11. The bipolar plate according to claim 10, wherein the first separator plate comprises at least one second through-opening for conducting a coolant or a reaction medium through the first separator plate and a second sealing structure surrounding the second through-opening for sealing the second through-opening, the second separator plate likewise includes a second through-opening, which is aligned with the second through-opening of the first separator plate, the mutually aligned second through-openings of the first separator plate and of the second separator plate forming a second through-opening of the bipolar plate, the first separator plate and the second separator plate enclosing a cavity for conducting a coolant through the bipolar plate, and the cavity being in fluid connection with the second through-opening of the bipolar plate.

12. The bipolar plate according to claim 11, wherein a fluid connection between the second through-opening of the bipolar plate and the cavity opens into the second through-opening of the bipolar plate on a side of the second through-opening of the bipolar plate which faces the active region.

13. The bipolar plate according to claim 11, wherein a cross-section of the second through-opening of the bipolar plate which is determined parallel to a planar surface plane of the bipolar plate increases toward the active region, at least in an end section of the second through-opening of the bipolar plate which faces the active region.

14. The bipolar plate according to claim 13, wherein the second through-opening of the bipolar plate, parallel to an overall media flow direction, in the active region, has a maximum diameter, which has a first end facing the active region, the aforementioned cross-section of the second through-opening being determined perpendicularly to this maximum diameter of the second through-opening, the aforementioned cross-section, in a contiguous section along this maximum diameter of the second through-opening consistently increasing strictly monotonically toward the active region, this contiguous section having a first end facing the active region and a second end facing away from the active region, a distance of the first end of the contiguous section from the first end of the maximum diameter of the second through-opening being 10 percent of the length of the maximum diameter of the second through-opening, and a distance of the second end of the contiguous section from the first end of the maximum diameter of the second through-opening being 40 percent of the length of the maximum diameter of the second through-opening.

15. The bipolar plate according to claim 14, wherein a cross-section of the first through-opening of the bipolar plate which is determined parallel to a planar surface plane of the bipolar plate increases toward a direction facing away from the active region, at least in an end section of the first through-opening of the bipolar plate which faces away from the active region.

16. The bipolar plate according to claim 15, wherein the first through-opening of the bipolar plate, parallel to an overall media flow direction, in the active region, has a maximum diameter, which has a first end facing the active region, the aforementioned cross-section of the first through-opening being determined perpendicularly to this maximum diameter of the first through-opening, the aforementioned cross-section of the first through-opening, in a contiguous section along this maximum diameter of the first through-opening, consistently increasing strictly monotonically in the direction facing away from the active region, this contiguous section having a first end facing the active region and a second end facing away from the active region, a distance of the first end of the contiguous section from the first end of the maximum diameter of the first through-opening being 60 percent of the length of the maximum diameter of the first through-opening, and a distance of the second end of the contiguous section from the first end of the maximum diameter of the first through-opening being 90 percent of the length of the maximum diameter of the first through-opening.

17. The bipolar plate according to claim 16, wherein the first through-opening of the bipolar plate and the second through-opening of the bipolar plate are arranged next to one another along a direction that is oriented transversely to a shortest straight connecting line between the first through-opening of the bipolar plate and the active region.

18. The bipolar plate according to claim 11, wherein the second through-opening of the bipolar plate is arranged between the first through-opening of the bipolar plate and the active region.

19. An electrochemical system, comprising a plurality of separator plates membrane assemblies arranged between the plurality of separator plates, where each separator plate comprises:

at least one first through-opening for conducting a reaction medium through the first separator plate;

an active region including structures for guiding the reaction medium along a flat side of the first separator plate; and a first sealing structure surrounding the first through-opening for sealing the first through-opening, the first sealing structure including a first passage for conducting the reaction medium through the first sealing structure, the first passage including a first passage opening facing away from the first through-opening, the first passage defining a first direction directed from the first through-opening toward the first passage opening; and the first through-opening being in fluid connection with the active region by way of the first passage, wherein the first passage is arranged and formed in such a way that the first direction includes an angle of at least 100 degrees with a second direction, the second direction being defined by a shortest straight connecting line connecting the first passage opening of the first passage to a media inlet or outlet of the active region, and the second direction being directed from the first passage opening of the first passage to the media inlet or outlet of the active region.

* * * * *